US012533594B2

United States Patent

Hao et al.

(10) Patent No.: US 12,533,594 B2
(45) Date of Patent: Jan. 27, 2026

(54) METHOD AND APPARATUS FOR GAME MATCHING, STORAGE MEDIUM, AND ELECTRONIC DEVICE

(71) Applicant: Beijing Bytedance Network Technology Co., Ltd., Beijing (CN)

(72) Inventors: Shuai Hao, Beijing (CN); Guande Qi, Beijing (CN); Jierui Chen, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 433 days.

(21) Appl. No.: 18/323,707

(22) Filed: May 25, 2023

(65) Prior Publication Data

US 2023/0381666 A1 Nov. 30, 2023

(30) Foreign Application Priority Data

May 25, 2022 (CN) ......................... 202210583584.4

(51) Int. Cl.
*A63F 13/795* (2014.01)

(52) U.S. Cl.
CPC .................................. *A63F 13/795* (2014.09)

(58) Field of Classification Search
CPC ........ A63F 13/795; A63F 13/67; A63F 13/79; A63F 13/822; A63F 2300/5566; A63F 2300/807; G06F 18/23
USPC ............................................................ 463/23
See application file for complete search history.

(56) References Cited

U.S. PATENT DOCUMENTS

| | | | |
|---|---|---|---|
| 2017/0259178 A1 | 9/2017 | Aghdaie et al. | |
| 2020/0250702 A1* | 8/2020 | Cheng | H04L 12/1859 |
| 2024/0325901 A1* | 10/2024 | Sthaneshwar | G06N 3/045 |

FOREIGN PATENT DOCUMENTS

| | | | | |
|---|---|---|---|---|
| CN | 109745708 A | 5/2019 | | |
| CN | 111111215 A | * 5/2020 | | A63F 13/765 |
| CN | 113941157 A | 1/2022 | | |
| JP | 2006-026237 A | 2/2006 | | |
| JP | 2014-236816 A | 12/2014 | | |

OTHER PUBLICATIONS

Chang, Xiaojun, et al. “Balanced k-means and min-cut clustering.” arXiv preprint arXiv:1411.6235 (2014).

(Continued)

*Primary Examiner* — Michael A Cuff

(57) ABSTRACT

The present disclosure relates to a method and an apparatus for game matching, a storage medium, and an electronic device. The method includes: obtaining a team feature of a game team to be matched; obtaining, by a pre-trained clustering model, a target class cluster to which the game team to be matched belongs according to the team feature, the clustering model being obtained by training with a constraint goal of differing in game levels of sample game teams in different class clusters under different game room types and minimizing a quantitative difference of sample game teams in any two class clusters under different game room types; allocating the game team to be matched to a target matching pool according to the target class cluster and a game room type; and determining, in the target matching pool, a game team matched with the game team to be matched.

20 Claims, 5 Drawing Sheets

(56) References Cited

OTHER PUBLICATIONS

Wang, Jingdong, et al. "Fast approximate k-means via cluster closures." Multimedia Data Mining and Analytics: Disruptive Innovation. Cham: Springer International Publishing, 2015. 373-395.

Office action received from Chinese patent application No. 202210583584.4 mailed on Apr. 7, 2025, 12 pages (6 pages English Translation and 6 pages Original Copy).

* cited by examiner

METHOD AND APPARATUS FOR GAME MATCHING, STORAGE MEDIUM, AND ELECTRONIC DEVICE

Under the applicable patent law and/or rules pursuant to the Paris Convention, this application is made to timely claim the priority to and benefits of Chinese Patent Application No. 202210583584.4, filed on May 25, 2022. For all purposes under the law, the entire disclosure of the aforementioned application is incorporated by reference as part of the disclosure of this application.

TECHNICAL FIELD

The present disclosure relates to the technical field of computers, in particular to a method and an apparatus for game matching, a storage medium, and an electronic device.

BACKGROUND

In a battle matching scenario of the multiplayer online battle arena (MOBA), usually a single user or a plurality of users make(s) up a game team first, and then battle matching is performed in units of game teams. In case of a great number of online game teams at the same time, battle matching needs to be performed on the online game teams concurrently to shorten a duration required for game matching and improve the efficiency of matching for a game.

At present, an approach of concurrent battle matching refers to randomly allocating online game teams to different matching pools to concurrently perform, in each matching pool, battle matching on game teams in the matching pool. In battle matching, it is preferred to match users of the same type. However, since game teams are randomly allocated to different matching pools, such an approach may result in increased difficulty of matching with a game team of the same type in the same matching pool and an increased duration required for game matching, thereby leading to reduced efficiency of matching for a game.

SUMMARY

The summary is provided to introduce concepts briefly, and these concepts will be described in detail in the following detailed description. The summary is neither intended to indicate the key features or essential features of the claimed technical solutions nor meant to limit the scope of the claimed technical solutions.

In the first aspect, the present disclosure provides a method for game matching, comprising:

obtaining a team feature of a game team to be matched;

obtaining, by a pre-trained clustering model, a target class cluster to which the game team to be matched belongs according to the team feature, wherein the clustering model is obtained by training with a constraint goal of differing in game levels of sample game teams in different class clusters under different game room types and minimizing a quantitative difference of sample game teams in any two class clusters under different game room types;

allocating the game team to be matched to a target matching pool of a plurality of matching pools according to the target class cluster of the game team to be matched and a game room type, wherein the matching pool is configured to accommodate game teams corresponding to one class cluster under different game room types, and a level difference between the game teams in the matching pool is minimum; and determining, in the target matching pool, a game team matched with the game team to be matched.

In the second aspect, the present disclosure further provides an apparatus for game matching, comprising:

an obtaining module, configured to obtain a team feature of a game team to be matched;

a first determination module, configured to obtain, by a pre-trained clustering model, a target class cluster to which the game team to be matched belongs according to the team feature, wherein the clustering model is obtained by training with a constraint goal of differing in game levels of sample game teams in different class clusters under different game room types and minimizing a quantitative difference of sample game teams in any two class clusters under different game room types;

an allocation module, configured to allocate the game team to be matched to a target matching pool of a plurality of matching pools according to the target class cluster of the game team to be matched and a game room type, wherein the matching pool is configured to accommodate game teams corresponding to one class cluster under different game room types, and a level difference between the game teams in the matching pool is minimum; and a matching module, configured to determine, in the target matching pool, a game team matched with the game team to be matched.

In the third aspect, the present disclosure further provides a computer-readable medium, on which a computer program is stored, and the computer program, when executed by a processor, causes the processor to perform steps of the method according to the first aspect.

In the fourth aspect, the present disclosure further provides an electronic device, comprising:

a storage apparatus, on which a computer program is stored; and a processing apparatus, configured to execute the computer program on the storage apparatus to perform steps of the method according to the first aspect.

With the above solutions, since the clustering model is obtained by training with a constraint goal of differing in game levels of sample game teams in different class clusters under different game room types and minimizing a quantitative difference of sample game teams in any two class clusters under different game room types, it can be guaranteed that a difference in the number of game teams to be matched under each game room type in each matching pool is minimized and a difference in game level between game teams to be matched allocated to the same matching pool is minimized if a target class cluster to which the game team to be matched belongs and the game room type are predicted according to the clustering model. Thus, a matching duration for battle matching of game teams in the same matching pool is shortened, and the efficiency of matching for a game is improved.

Other features and advantages of the present disclosure will be described in detail in the following detailed description.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numerals refer to the same or similar elements. It should be understood that the drawings are schematic and that the components and elements are not necessarily drawn to scale. In the accompanying drawings.

DETAILED DESCRIPTION

Figure 1:
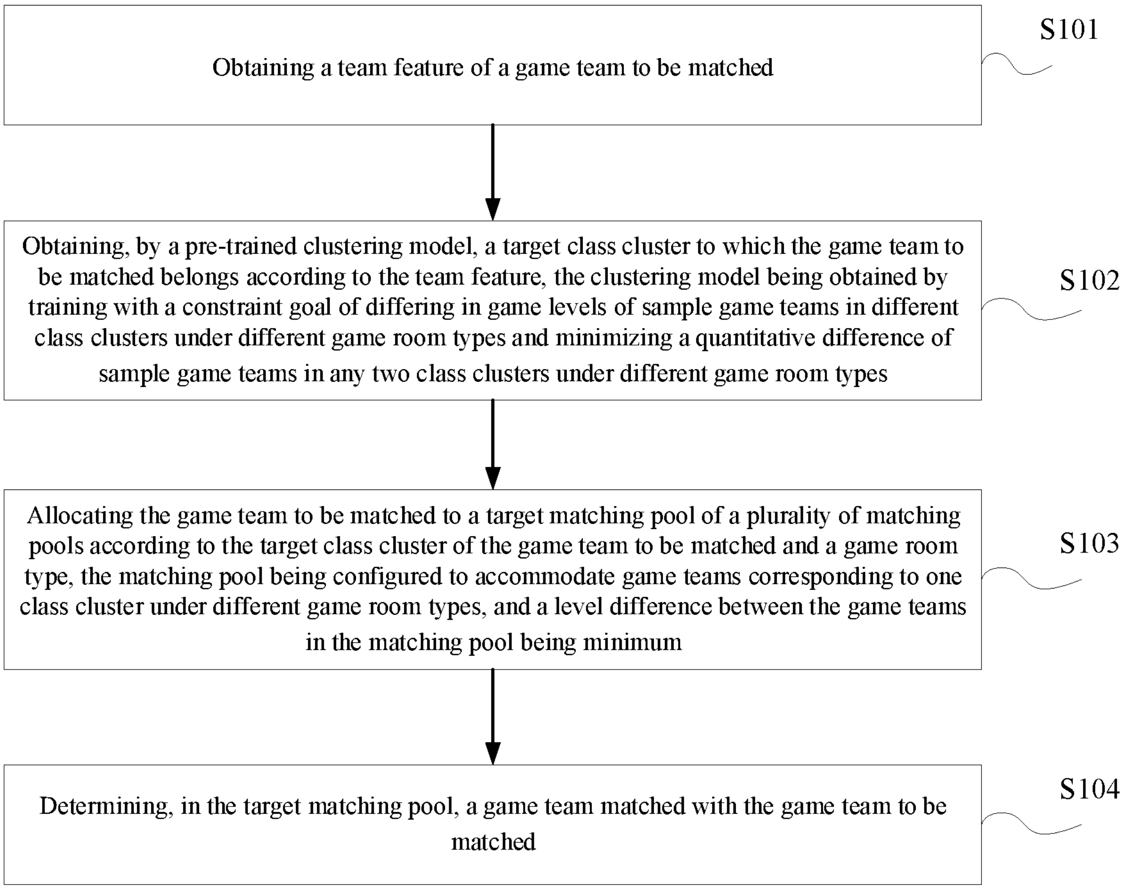
FIG. 1 is a flowchart of a method for game matching illustrated according to an exemplary embodiment of the present disclosure.

The embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Rather, these embodiments are provided for a thorough and complete understanding of the present disclosure. It should be understood that the drawings and embodiments of the present disclosure are only for exemplary purposes and are not intended to limit the protection scope of the present disclosure.

It should be understood that the various steps described in the method implementations of the present disclosure may be performed in different orders and/or in parallel. Furthermore, the method implementations may include additional steps and/or omit performing the illustrated steps. The protection scope of the present disclosure is not limited in this aspect.

As used herein, the terms "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

It should be noted that concepts such as the "first," "second," or the like mentioned in the present disclosure are only used to distinguish different devices, modules or units, and are not used to limit the interdependence relationship or the order of functions performed by these devices, modules or units.

It should be noted that the modifications of "a," "an," "a plurality of," and the like mentioned in the present disclosure are illustrative rather than restrictive, and those skilled in the art should understand that unless the context clearly indicates otherwise, these modifications should be understood as "one or more."

The names of messages or information exchanged between multiple devices in the embodiments of the present disclosure are only for illustrative purposes, and are not intended to limit the scope of these messages or information.

It should be understood that before using the technical solutions disclosed in various embodiments of the present disclosure, a user should be notified of a type, a range of use, a usage scenario and the like of personal information involved in the present disclosure in an appropriate manner in accordance with relevant laws and regulations, and these should be authorized by the user.

For example, in response to receiving an active request from a user, prompt information is sent to the user to explicitly prompt the user that the operation the user requests to perform will require to acquire and use the personal information of the user. Thus, the use can independently select, according to the prompt information, whether or not to provide the personal information to the software or hardware such as an electronic device, an application, a server, or a storage medium that performs the operations of the technical solutions of the present disclosure.

As an alternative but non-limiting implementation, in response to receiving an active request from a user, a manner of sending prompt information to the user may be, for example, using a pop-up window in which the prompt information may be presented in the form of text. Furthermore, the pop-up window may also carry option controls for the user to select to "agree" or "disagree" with providing personal information to an electronic device.

It should be understood that the processes of notifying of and authorizing by a user described above are merely exemplary and do not constitute a limitation on the implementations of the present disclosure, and other manners meeting relevant laws and regulations may also be applied to the implementations of the present disclosure.

Meanwhile, it should be understood that data (including but not limited to data itself, and the acquisition or use of data) involved in the present technical solutions should follow corresponding laws and regulations and requirements of relevant stipulations.

As stated in the background, in the battle matching of MOBA, it is preferred to perform battle matching on game teams of the same type. In MOBA, usually a single user or a plurality of users make(s) up a game team first, and then matching is performed in the unit of one game team. The type as used herein means a game level of each user in the game team. That is, in the battle matching, it is desired to match game teams having a small difference in game level therebetween to guarantee the game experience of users. Therefore, when concurrently matching game teams in different matching pools, it is vital how to guarantee that game teams of the same type can be matched rapidly in each matching pool.

In view of this, the embodiments of the present disclosure provide a method and an apparatus for game matching, a storage medium, and an electronic device. The embodiments of the present disclosure will be explained and described in detail with reference to the accompanying drawings.

FIG. 1 is a flowchart of a method for game matching illustrated according to an exemplary embodiment of the present disclosure. The method for game matching may be applied to an electronic device. With reference to FIG. 1, the method for game matching may include the following steps.

Step S101: obtaining a team feature of a game team to be matched.

In some embodiments, the electronic device may perform the step of obtaining a team feature of a game team to be matched in response to a game request operation initiated by a user for a game application installed on a game terminal.

In some embodiments, obtaining the team feature of the game team to be matched may be achieved by: obtaining a user feature and/or a device feature corresponding to at least one user in the game team to be matched; and determining the team feature of the game team to be matched according to the user feature and/or the device feature in the game team to be matched.

As mentioned above, the user feature is a feature of a user making up the game team to be matched, and the device feature is a feature of the game terminal by which the user initiates the game request operation.

In some embodiments, the user feature may be a feature constructed by a division feature and an Elo rating, and the division feature and the Elo rating may reflect a game level of a user. The division feature may include features of different granularities (a large division and a small division). For example, using digits to characterize the division feature, 1 to 7 may be used to represent different large divisions, and 1 to 31 may be used to represent different small divisions. Different digits characterize different game levels of users.

The device feature may be a ping value which refers to the time from transmitting data from the game terminal to a game server to receiving feedback data from the game server and is used to characterize a network delay of the game terminal.

In the case that the team feature is determined by the user feature and the device feature, the team feature may be determined by: vectorizing the user feature and the device feature in the game team to be matched, respectively, and obtaining a user feature vector corresponding to the user feature and a device feature vector corresponding to the device feature; and concatenating the user feature vector and the device feature vector to obtain a team feature vector for characterizing the team feature.

Taking the above-mentioned exemplary division feature, Elo rating and ping value as an example, obtaining the team feature of the game team to be matched is exemplarily described. The team feature of the game team to be matched is represented by a vector feature which may be formed by concatenating a vector of an Elo rating dimension, a vector of a first-team large division dimension, a vector of a first-team small division dimension, a vector of a second-team large division dimension, a vector of a second-team small division dimension, a vector of a third-team large division dimension, a vector of a third-team small division dimension, and a vector of a ping value dimension.

A parameter in the vector of the Elo rating dimension may include a highest Elo rating, a lowest Elo rating, and an average Elo rating of Elo ratings of all users in the game team to be matched, and further include a value obtained by performing mean variance normalization on the Elo ratings of all the users.

A parameter in the vector of the first-team large division dimension may include a highest large division, a lowest large division, and an average large division of large divisions of all the users in the game team to be matched.

A parameter in the vector of the first-team small division dimension may include a highest small division, a lowest small division, and an average small division of small divisions of all the users in the game team to be matched.

A parameter in the vector of the second-team large division dimension may include large divisions of all the users in the game team to be matched.

A parameter in the vector of the second-team small division dimension may include small divisions of all the users in the game team to be matched.

A parameter in the vector of the third-team large division dimension may include the number of users of each large division in the game team to be matched. This vector may be standardized as a vector having a modulus length of 1.

A parameter in the vector of the third-team small division dimension may include the number of users of each small division in the game team to be matched. This vector may be standardized as a vector having a modulus length of 1. The vector may be standardized as a vector having a modulus length of 1 with reference to the related art, which will not be redundantly described here in the present embodiment.

A parameter in the vector of the ping value dimension may include a mean value of ping values of all users in the game team to be matched to different game servers. For example, the vector of the ping value dimension=[ping−1, ping−2, ping−3, ping−4, ping−5, ping−6], wherein ping−1 may be used to characterize a mean value of ping values of all the users in the game team to be matched to a game server 1, ping−2 may be used to characterize a mean value of ping values of all the users in the game team to be matched to a game server 2, and in a similar fashion, ping−6 may be used to characterize a mean value of ping values of all the users in the game team to be matched to a game server 6.

In some embodiments, ping values may be normalized to be mapped into a range of (0, 1). For example, each parameter may be normalized by using the following formula:

$$\text{value} = \begin{cases} 1 & \text{if ping} \le P_{comf} \\ 1 - 2 * \left( \dfrac{1}{1 + e^{-k\left(ping - P_{comf}\right)}} - 0.5 \right) & \text{if ping} > P_{comf} \\ 0 & \text{if ping} = \text{null} \end{cases} \quad (1)$$

In the above formula (1), different determination manners for mapped values correspond to specific ping values, respectively. For the formula, value is a mapped value corresponding to a ping value; k is a preset value, which represents a slope of the influence of a change in the ping value on the mapped value, and the greater the absolute value of k, the greater the influence of the ping value changing per unit on the mapped value; and $P_{comf}$ represents a critical value of battle comfort of a user. When the ping value is less than or equal to $P_{comf}$, it is considered that the user's battle experience is comfortable.

In consideration of a difference in user experience of delay due to overall network situations of different countries/regions, for example, in a country/region having a high overall network delay, the tolerance of users is relatively high, and $P_{comf}$ should be greater. On the contrary, in a country/region having a low overall network delay, the tolerance of users is relatively low, and $P_{comf}$ should be smaller. In some implementations, statistical critical values of tolerance of users to network delay in each country/region may be collected, and based on the statistics, a mean value of critical values of tolerance of all the users to network delay may be taken as $P_{comf}$ of the country/region.

It needs to be noted that the above-mentioned exemplary vector feature does not result in a limitation to the concatenating order of the vectors of different dimensions in the present embodiment. Besides, the above-mentioned vectors of different dimensions may be arbitrarily combined to obtain a vector feature characterizing the team feature.

In some embodiments, a value of a division (a large division or a small division) may be mapped into a range of (0, 1). With continuous reference to the above example in which 1 to 7 may be used to represent different large divisions and 1 to 31 may be used to represent different small divisions, for example, if the large division of a user A in the game team to be matched is 1, the corresponding mapped value may be 1/7; and if the small division of the user A is 10, the corresponding mapped value may be 10/31.

It needs to be noted that the above-mentioned parameters are mapped into a same value range (e.g., (0, 1)) for the convenience of comparison between data, e.g., for the convenience of comparison on game level between game teams to be matched.

Step S102: obtaining, by a pre-trained clustering model, a target class cluster to which the game team to be matched belongs according to the team feature, the clustering model being obtained by training with a constraint goal of differing in game levels of sample game teams in different class clusters under different game room types and minimizing a quantitative difference of sample game teams in any two class clusters under different game room types.

It needs to be noted that a basic condition for achieving the objective of the present disclosure is that the distribution of obtained game teams to be matched is consistent with that of sample game teams for pre-training the clustering model.

It should be necessary that the clustering model includes clustering sub-models corresponding to different game room types, and each clustering sub-model is used for predicting a target class cluster for the game team to be matched of the game room type matched with the clustering sub-model.

Exemplarily, taking for example that the game room types include one user, two users, three users, four users and five users, each of which corresponds to one clustering sub-model.

In some embodiments, the clustering model may be obtained by the following process: for a sample game team corresponding to each game room type, performing, with a goal constraint, iterative optimization on a parameter of an initial clustering sub-model corresponding to the game room type according to a sample team feature of the sample game team corresponding to the game room type, until an iteration stop condition is met, so as to obtain a clustering sub-model corresponding to the game room type; and determining the clustering model according to clustering sub-models corresponding to all game room types. The goal constraint is: a minimum quantitative difference of sample game teams between different class clusters and a minimum difference in game level between sample game teams in a same class cluster.

It should be understood that the clustering model may be obtained by combining the clustering sub-models respectively corresponding to different game room types.

Figure 2:
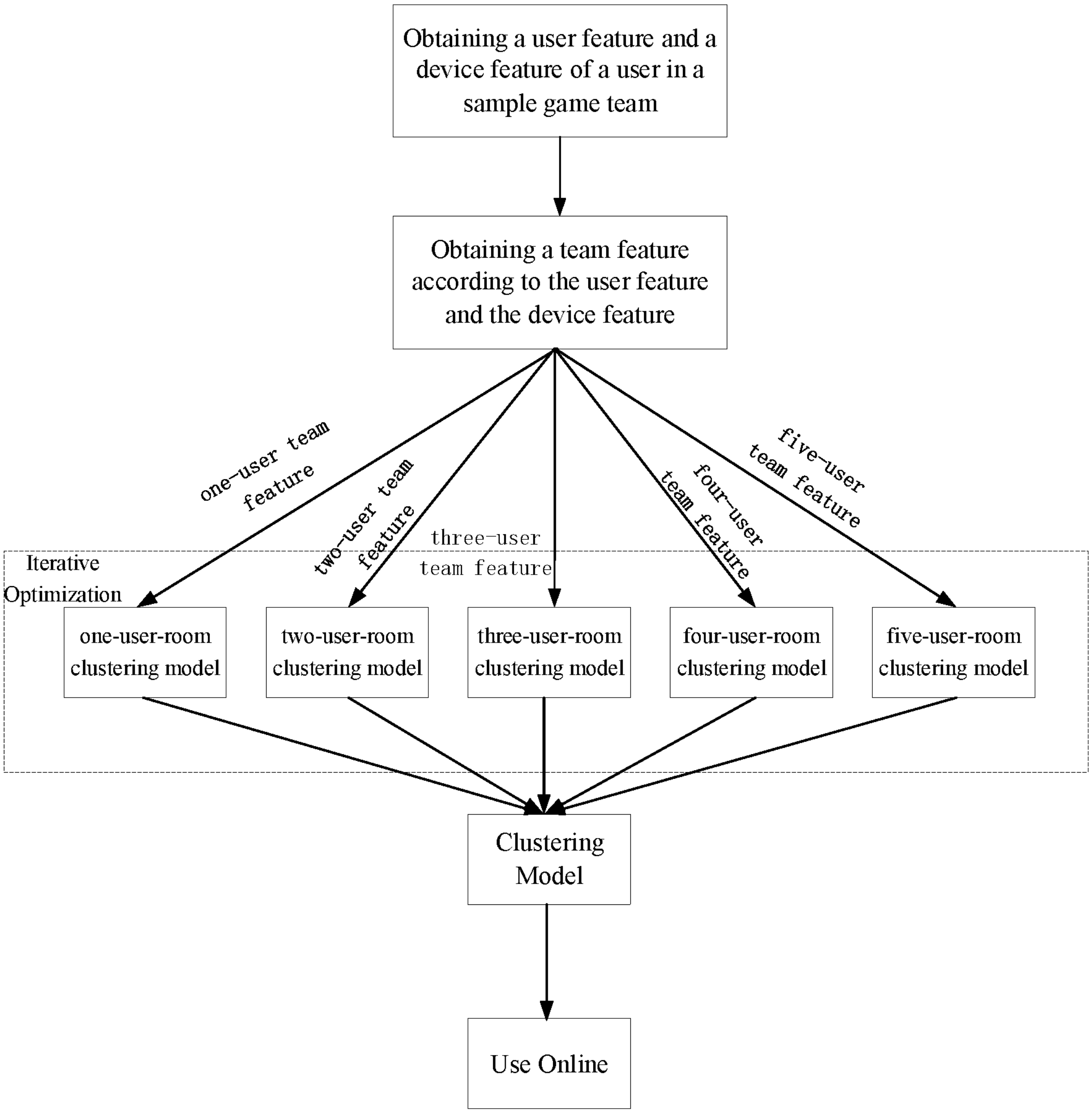
FIG. 2 is a schematic diagram of a training process of a clustering model illustrated according to an exemplary embodiment of the present disclosure.

With reference to FIG. 2, taking for example that the game room types include one user, two users, three users, four users, and five users, iterative optimization is separately performed on the parameters of the initial clustering sub-models corresponding to one user, two users, three users, four users, and five users according to the sample team features of the sample game teams corresponding to one user, two users, three users, four users, and five users to obtain target parameters (the target parameter decides the clustering sub-model) respectively corresponding to one user, two users, three users, four users, and five users. For example, the one-user-room clustering model in FIG. 2 characterizes the clustering sub-model corresponding to one user; the two-user-room clustering model in FIG. 2 characterizes the clustering sub-model corresponding to two users; the three-user-room clustering model in FIG. 2 characterizes the clustering sub-model corresponding to three users; the four-user-room clustering model in FIG. 2 characterizes the clustering sub-model corresponding to four users; and the five-user-room clustering model in FIG. 2 characterizes the clustering sub-model corresponding to five users. The clustering model may be obtained by combining the clustering sub-models corresponding to the different game room types in FIG. 2 and put into use online.

In the present embodiment, the sample team feature may be obtained with reference to the implementation process of obtaining the team feature of the game team to be matched in FIG. 1, which will not be redundantly described here in the present embodiment.

The parameters corresponding to different game room types are similar. Taking the game room type of five users as an example, the specific construction process of the parameter of the game room type of five users is explained and described below. The parameter is constructed by adding a regularization term on the basis of a function corresponding to the K-Means clustering algorithm, wherein the regularization term is used to constrain a quantitative difference between different clusters. Therefore, in the present embodiment, the parameter includes two sub-functions, with a first term being a function corresponding to the K-Means clustering algorithm and a second term being a regularization term.

The function corresponding to the first term is:

$$\min_{F,H} \|X - HF^T\|_F^2 \quad (2)$$
$$s.t.\ H_{ik} \in \{0, 1\}, \sum_{k=1}^{K} H_{i,k} = 1, \forall\ i = 1, 2, \cdots, N$$

where s.t. represents the symbol of being constrained to. In the linear programming problem of mathematics, a constraint in mathematics is a condition that an optimization solution to a problem needs to meet. In the above formula (2), $X \in R^{d \times N}$, which is a data matrix with dimensions of d×N, i.e., characterizing a sample team feature set for the sample game team corresponding to the game room type of five users; N represents the number of the sample game teams (equivalent to samples described below) corresponding to the game room type of five users (hereinafter referred to as the number of samples for short); d represents a dimension of the sample team feature; $F \in R^{d \times K}$ is an initial indication matrix with dimensions of d×K; K represents the total number of class clusters corresponding to the game room type of five users; each column of F may be construed as a clustering center vector of each class cluster; $H \in R^{N \times K}$ is an initial allocation matrix with dimensions of N×K; only one digit in each row of H is 1, and other digits are 0; and $H_{i,k}=1$ represents that the class cluster to which the i-th sample belongs is the k class cluster.

In the case of F being given, one regularization term may be introduced to constrain the number equilibrium of each class cluster, and the second term of the parameter is:

$$\|F\|_e = T_r(F^T 1 1^T F) \quad (3)$$

In the above formula (3), $T_r$ represents the trace of a matrix; 1 represents a matrix of which all digits are 1; $F^T$ represents the transposition of F; and $1^T$ represents the transposition of 1. As it can be seen from the above formula, $\|F\|_e$ is equal to the square sum of the number of samples of each class cluster, and the following may be derived:

$$\|F\|_e = n_1^2 + n_2^2 + \ldots + n_k^2 = \Sigma_{i=1}^{k} n_i^2 \quad (4)$$

In the above formula (4), $n_i$ represents the number of samples of the i-th class cluster; and to minimize $\|F\|_e$, it is necessary to let $$n_i = \frac{N}{k},$$

where N is the total number of samples of all class clusters. This conclusion may be proved by using the Cauchy inequality, and the specific proof process is as shown below.

The following formula may be derived according to the Cauchy inequality:

$$(n_1^2 + n_2^2 + \ldots + n_k^2)(b_1^2 + b_2^2 + \ldots + b_k^2) \geq (n_1 b_1 + n_2 b_2 + \ldots + n_k b_k) \quad (5)$$

Letting $b_i=1$, i=1, 2, . . . , k, the above formula (5) may be simplified as:

$$k(n_1^2 + n_2^2 + \ldots + n_k^2) \geq (n_1 + n_2 + \ldots + n_k)^2 \quad (6)$$

As it can be seen from the Cauchy inequality, when and only when $n_1 = n_2 = \ldots = n_k$, the equal sign for the inequality is satisfied, and in this case, $$n_i = \frac{N}{k}.$$

Furthermore, to measure that the minimization of a quantitative difference between class clusters is more emphasized during the iterative optimization, a weight hyper-parameter is introduced, and a greater weight hyper-parameter may characterize that the minimization of the quantitative difference between class clusters is more emphasized during the iterative optimization.

In conclusion, the parameter may be:

$$\min_{F,H} \|X - HF^T\|_F^2 + \gamma \|F\|_e \quad (7)$$

where $\gamma$ is the weight hyper-parameter. When performing iteration optimization on the parameter, the goal constraint is taken as the target until the iteration stop condition is met, so as to obtain the target parameter corresponding to this game room type, i.e., the clustering sub-model corresponding to this game room type.

As it can be seen from the above, the parameter of the initial clustering sub-model corresponding to a different game room type includes an initial allocation matrix and an initial indication matrix. Therefore, an idea of alternately performing iterative optimization on the initial allocation matrix and the initial indication matrix may be used in iterative updating of the parameter of the initial clustering sub-model to realize the iterative optimization of the parameter. For example, the iterative optimization of the parameter may include the following process: for the sample game team corresponding to each game room type, performing, with the goal constraint, the iterative optimization on the initial allocation matrix and the initial indication matrix according to the sample team feature of the sample game team corresponding to the game room type, until the iteration stop condition is met, so as to obtain the clustering sub-model corresponding to the game room type.

In some embodiments, the iteration stop condition includes the matrix no longer changing during the iterative optimization, or the number of iterative optimization times being greater than the preset number of times. It needs to be noted that the matrix during the iterative optimization here includes the initial allocation matrix and the initial indication matrix, and the preset number of times may be set according to an actual situation, which will not be limited here in the present embodiment.

The iterative optimization performed on the initial allocation matrix and the initial indication matrix with the goal constraint is further explained and described below, including the following process:

for the sample game team corresponding to each game room type, determining a target indication matrix that minimizes a value of the parameter according to the initial allocation matrix and the sample team feature of the sample game team corresponding to the game room type; determining a target allocation matrix that minimizes the value of the parameter according to the target indication matrix and the sample team feature of the sample game team corresponding to the game room type, and in a case that the iteration stop condition preset is not met, determining the target allocation matrix as a new initial allocation matrix and returning to perform the step of determining the target indication matrix that minimizes the value of the parameter according to the initial allocation matrix and the sample team feature of the sample game team corresponding to the game room type, until the iteration stop condition preset is met; and obtaining the clustering sub-model according to a corresponding target indication matrix and a corresponding target allocation matrix when the iteration stop condition preset is met.

Firstly, it needs to be noted that the initial allocation matrix needs to be preset as a known parameter. In the above processes, controlling the initial allocation matrix to remain unchanged, i.e., taking the initial allocation matrix as a known parameter, the target indication matrix that minimizes the value of the initial function is calculated. An implementation of the process may be as follows: letting a derivative of the initial function be equal to 0, the following formula may be derived:

$$F = XH(H^T H)^{-1} \quad (8)$$

The target indication matrix (i.e., F) that satisfies the above formula is calculated according to the initial allocation matrix (i.e., H) and the team feature (i.e., X) of a historical game team to be matched.

In the case that the target indication matrix is obtained, the target indication matrix is taken as a known parameter and then the initial allocation matrix is updated. That is, a target allocation matrix that minimizes the value of the parameter is determined according to the target indication matrix and the sample team feature of the sample game team corresponding to the game room type. An implementation of the process may be as follows: each row of the initial allocation matrix is updated orderly from top to bottom; for the i-th row, a value corresponding to a cluster that minimizes the parameter is set to 1 and values corresponding to other clusters are set to 0 until the n-th row is updated completely, whereby the target allocation matrix is obtained. When updating the (i+1)-th row, all rows before the (i+1)-th row that minimizes the parameter are calculated, subject to the updated values.

The target allocation matrix is taken as a new initial allocation matrix, and a target indication matrix that satisfies the above formula (8) is calculated according to the new initial allocation matrix and the team feature of the sample game team until the preset iteration stop condition is met.

In the case that the preset iteration stop condition is met, the clustering sub-model is obtained according to the corresponding target indication matrix and the corresponding target allocation matrix when the preset iteration stop condition is met. The target indication matrix is used to indicate the clustering center vector of each class cluster, and the target allocation matrix is used to indicate the class cluster corresponding to each sample. The class cluster to which the game team to be matched belongs may be determined according to the target allocation matrix. Using the target indication matrix to indicate the clustering center vector of each class cluster may be used in pre-generating a plurality of matching pools in Step S103, and the specific generation manner will be explained and described in Step S103, which will not be limited here in the present embodiment.

In the above manner, by dividing according to the class cluster to which each sample in the target allocation matrix belongs, the minimization of the quantitative difference between class clusters may be satisfied. The same class cluster (the same game level) under different game room types may be pointed to the same matching pool according to the target indication matrix.

Step S103: allocating the game team to be matched to a target matching pool of a plurality of matching pools according to the target class cluster of the game team to be matched and a game room type, the matching pool being configured to accommodate game teams corresponding to one class cluster under different game room types, and a level difference between the game teams in the matching pool being minimum.

It needs to be noted that one class cluster corresponds to one game level such that the difference in game level between game teams allocated to the same matching pool is minimum.

As it can be seen from the above embodiment with respect to Step S102, the target indication matrix is used to indicate the clustering center vector of each class cluster. Therefore, class clusters having the minimum difference in game level may be bound to the same matching pool in advance according to the target indication matrices corresponding to different clustering sub-models. Thus, matching of game teams at the same level may be performed in the same matching pool in practical use.

In some embodiments, the binding process described above may be: determining, by using a dynamic path planning algorithm, a mapping relationship between each class cluster in target indication matrices corresponding to different clustering sub-models and the matching pool according to target indication matrices corresponding to all clustering sub-models. The constraint goal of the dynamic path planning algorithm is to minimize a distance between the clustering center vectors of various class clusters in the same matching pool, thereby satisfying that the difference between the game levels corresponding to the class clusters to which the game teams in the same matching pool belong is minimized. The dynamic path planning algorithm may be, for example, a dynamic path planning algorithm involved in the traveling salesman problem (see the related art for details), which will not be redundantly described here in the present embodiment.

Figure 3:
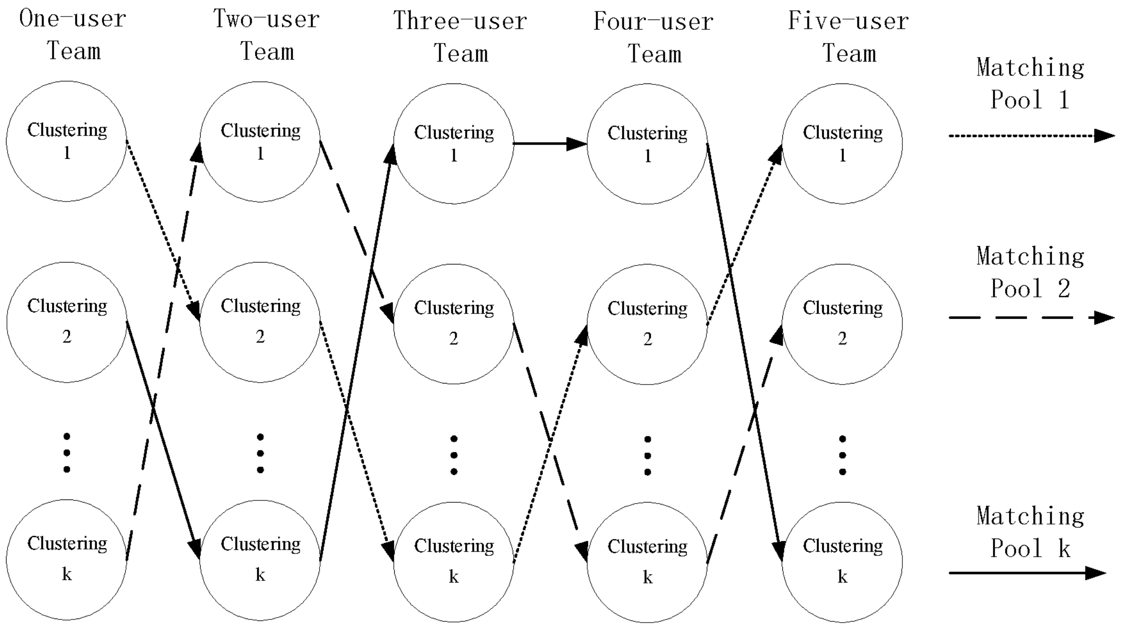
FIG. 3 is a schematic diagram of a class cluster binding matching pool illustrated according to an exemplary embodiment of the present disclosure.

With reference to FIG. 3, still taking for example that the game room types include the one-user team, two-user team, three-user team, four-user team, and five-user team, k clusters are set under each game room type, and the difference in number between clusters under the same game room type is minimized. That is, the difference in number between clusters under the one-user team is minimum. Each path (the path formed by each line shown in FIG. 3) corresponds to one matching pool, and each matching pool (matching pool 1, matching pool 2, . . . , matching pool k) includes one cluster under each game room type therein, and the difference in game level between clusters under the same matching pool is minimum. That is, the difference in game level between the cluster 1 under the one-user team and the cluster 2 under the two-user team is minimum among game differences between the cluster 1 under the one-user team and all the clusters under the two-user team.

Figure 4:
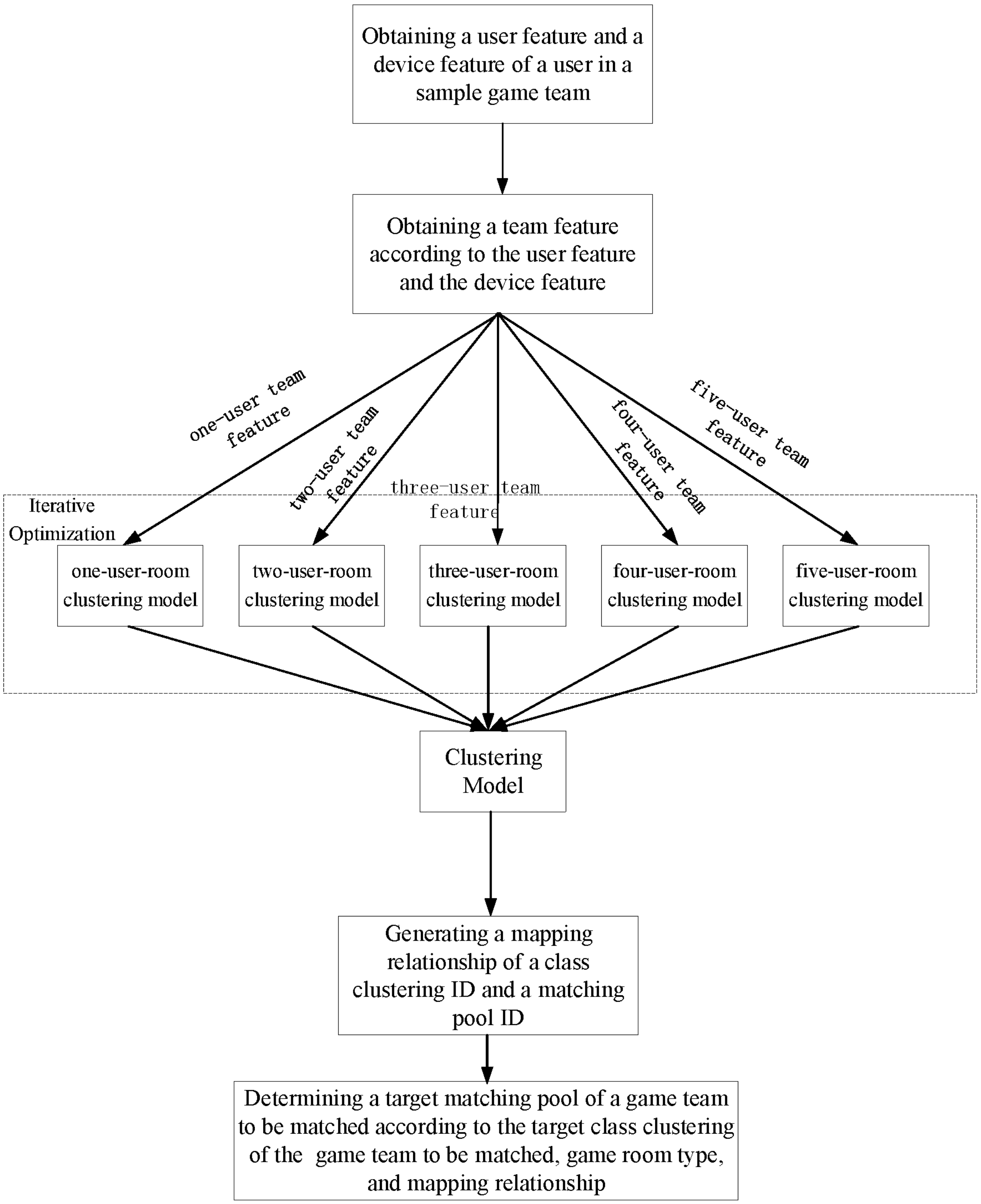
FIG. 4 is another flowchart of a method for game matching illustrated according to an exemplary embodiment of the present disclosure.

With reference to FIG. 4, after the clustering model is obtained, a plurality of matching pools may be determined according to the target indication matrix corresponding to the clustering sub-model and by using the above-mentioned dynamic path planning algorithm, and then the mapping relationships between various class clusters in the target indication matrices corresponding to the different clustering sub-models and the matching pools may be generated. For example, a mapping relationship list includes a plurality of class cluster IDs and a matching pool ID corresponding to each class cluster ID, so that the target matching pool for the game team to be matched can be determined. The class cluster ID here includes class cluster IDs under different game room types.

Taking that shown in FIG. 3 for example, the class cluster ID of the cluster 1 under the one-user team corresponds to the ID of the matching pool 1. In practical use, according to the target class cluster of the game team to be matched and the game room type, a class cluster ID corresponding to the game room type and the target class cluster is looked up in the mapping relationship list, and the matching pool ID corresponding to the class cluster ID is determined as the target matching pool. Thus, the game team to be matched is allocated to the target matching pool.

Step S104: determining, in the target matching pool, a game team matched with the game team to be matched.

It needs to be noted that the determined game team matched with the game team to be matched may be a friendly game team for the game team to be matched or a rival game team for the game team to be matched. Besides, the game team matched with the game team to be matched is a team matched with the game team to be matched in terms of game level.

In some embodiments, Step S104 may be specifically implemented by: in the target matching pool, determining a first game team and a second game team matched with each other in terms of game level, wherein each of the first game team and the second game team is a team made up by at least one game team to be matched in the target matching pool, and each of the first game team and the second game team includes a preset number of users.

Exemplarily, taking for example that the target matching pool includes game teams to be matched having one user, two users, three users, four users, and five users and the preset number of users is 5, the first game team or the second game team may be made up by only one game team to be matched having five users or may be made up by one game team to be matched having one user and two game teams to be matched each having two users. Furthermore, this example does not result in a limitation to the combination manner of the first game team or the second game team. A team having the preset number of users made up by game teams to be matched having different numbers of users may serve as the first game team or the second game team.

Through the methods described above, since the clustering model is obtained by training with the constraint goal of differing in game levels of sample game teams in different class clusters under different game room types and minimizing a quantitative difference of sample game teams in any two class clusters under different game room types, it can be guaranteed that a difference in the number of game teams to be matched under each game room type in each matching pool is minimized and a difference in game level between game teams to be matched allocated to the same matching pool is minimized if a target class cluster to which the game team to be matched belongs and the game room type are predicted according to the clustering model. Thus, a matching duration for battle matching of game teams in the same matching pool is shortened, and the efficiency of matching for a game is improved.

Figure 5:
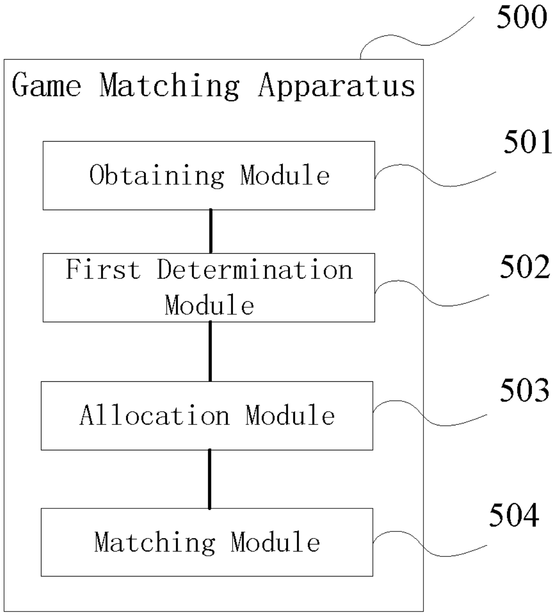
FIG. 5 is a block diagram of an apparatus for game matching illustrated according to an exemplary embodiment of the present disclosure.

FIG. 5 is a block diagram of an apparatus for game matching illustrated according to an exemplary embodiment of the present disclosure. The apparatus 500 for game matching includes:

an obtaining module 501, configured to obtain a team feature of a game team to be matched;

a first determination module 502, configured to obtain, by a pre-trained clustering model, a target class cluster to which the game team to be matched belongs according to the team feature, wherein the clustering model is obtained by training with a constraint goal of differing in game levels of sample game teams in different class clusters under different game room types and minimizing a quantitative difference of sample game teams in any two class clusters under different game room types;

an allocation module 503, configured to allocate the game team to be matched to a target matching pool of a plurality of matching pools according to the target class cluster of the game team to be matched and a game room type, wherein the matching pool is configured to accommodate game teams corresponding to one class cluster under different game room types, and a level difference between the game teams in the matching pool is minimum; and a matching module 504, configured to determine, in the target matching pool, a game team matched with the game team to be matched.

Optionally, the obtaining module 501 includes:

a first obtaining sub-module, configured to obtain a user feature and/or a device feature corresponding to at least one user in the game team to be matched; and a first determination sub-module, configured to determine the team feature of the game team to be matched according to the user feature and/or the device feature in the game team to be matched.

Optionally, in a case that the team feature is determined by the user feature and the device feature, the first determination sub-module is specifically configured to: vectorize the user feature and the device feature in the game team to be matched, respectively, and obtain a user feature vector corresponding to the user feature and a device feature vector corresponding to the device feature; and concatenate the user feature vector and the device feature vector to obtain a team feature vector for characterizing the team feature.

Optionally, the clustering model includes clustering sub-models corresponding to different game room types, and the apparatus 500 further includes:

an iteration module, configured to, for a sample game team corresponding to each game room type, perform, with a goal constraint, iterative optimization on a parameter of an initial clustering sub-model corresponding to the game room type according to a sample team feature of the sample game team corresponding to the game room type, until an iteration stop condition is met, so as to obtain a clustering sub-model corresponding to the game room type; and a second determination module, configured to determine the clustering model according to clustering sub-models corresponding to all game room types.

The goal constraint is: a minimum quantitative difference of sample game teams between different class clusters and a minimum difference in game level between sample game teams in a same class cluster.

Optionally, the parameter of the initial clustering sub-model includes an initial allocation matrix and an initial indication matrix, and the iteration module includes:

an iteration sub-module, configured to, for the sample game team corresponding to each game room type, perform, with the goal constraint, the iterative optimization on the initial allocation matrix and the initial indication matrix according to the sample team feature of the sample game team corresponding to the game room type, until the iteration stop condition is met, so as to obtain the clustering sub-model corresponding to the game room type.

The iteration stop condition includes: the matrix no longer changing during the iterative optimization, or a number of iterative optimization times being greater than a preset number of times.

Optionally, the iteration sub-module is specifically configured to: for the sample game team corresponding to each game room type, determine a target indication matrix that minimizes a value of the parameter according to the initial allocation matrix and the sample team feature of the sample game team corresponding to the game room type;

determine a target allocation matrix that minimizes the value of the parameter according to the target indication matrix and the sample team feature of the sample game team corresponding to the game room type, and in a case that the iteration stop condition preset is not met, determine the target allocation matrix as a new initial allocation matrix and return to perform determining the target indication matrix that minimizes the value of the parameter according to the initial allocation matrix and the sample team feature of the sample game team corresponding to the game room type, until the iteration stop condition preset is met; and obtain the clustering sub-model according to a corresponding target indication matrix and a corresponding target allocation matrix when the iteration stop condition preset is met.

Optionally, the apparatus 500 further includes:

a third determination module, configured to determine, by using a dynamic path planning algorithm, a mapping relationship between each class cluster in target indication matrices corresponding to different clustering sub-models and the matching pool according to target indication matrices corresponding to all clustering sub-models.

Figure 6:
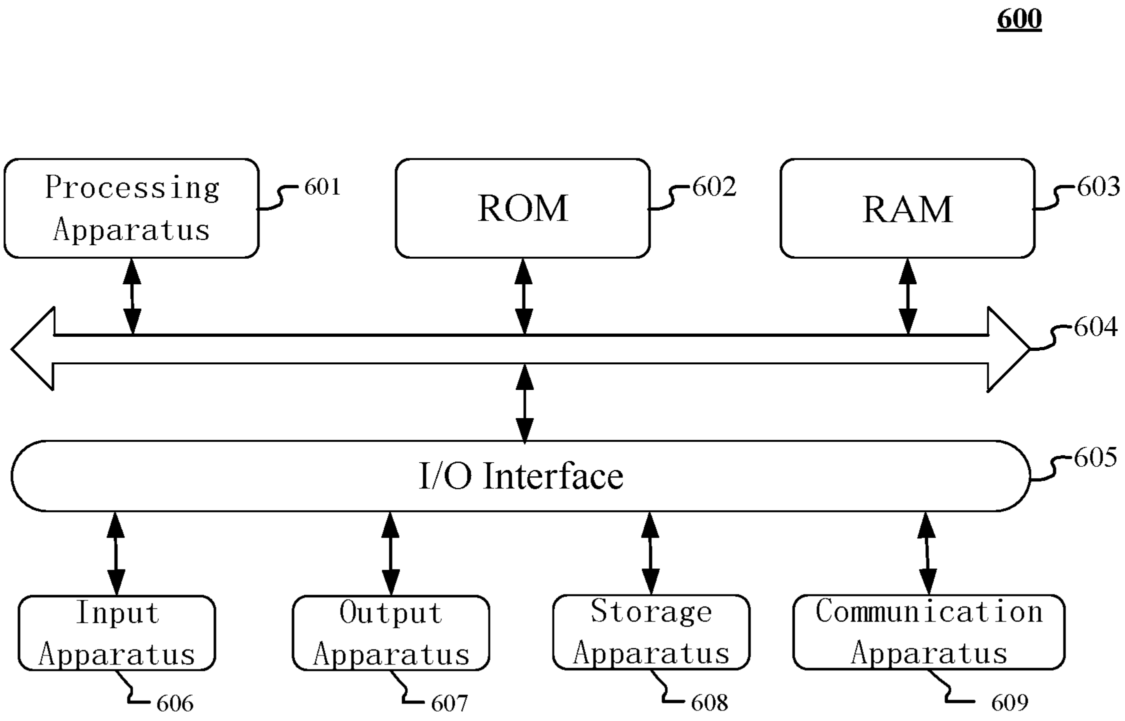
FIG. 6 is a schematic structural diagram of an electronic device illustrated according to an exemplary embodiment of the present disclosure.

Referring to FIG. 6, FIG. 6 illustrates a schematic structural diagram of an electronic device 600 suitable for implementing some embodiments of the present disclosure. The electronic devices or terminal devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal) or the like, and fixed terminals such as a digital TV, a desktop computer, or the like. The electronic device illustrated in FIG. 6 is merely an example, and should not pose any limitation to the functions and the range of use of the embodiments of the present disclosure.

As illustrated in FIG. 6, the electronic device 600 may include a processing apparatus 601 (e.g., a central processing unit, a graphics processing unit, etc.), which can perform various suitable actions and processing according to a program stored in a read-only memory (ROM) 602 or a program loaded from a storage apparatus 608 into a random access memory (RAM) 603. The RAM 603 further stores various programs and data required for operations of the electronic device 600. The processing apparatus 601, the ROM 602, and the RAM 603 are interconnected by means of a bus 604. An input/output (I/O) interface 605 is also connected to the bus 604.

Usually, the following apparatus may be connected to the I/O interface 605: an input apparatus 606 including, for example, a touch screen, a touch pad, a keyboard, a mouse, a camera, a microphone, an accelerometer, a gyroscope, or the like; an output apparatus 607 including, for example, a liquid crystal display (LCD), a loudspeaker, a vibrator, or the like; a storage apparatus 608 including, for example, a magnetic tape, a hard disk, or the like; and a communication apparatus 609. The communication apparatus 609 may allow the electronic device 600 to be in wireless or wired communication with other devices to exchange data. While FIG. 6 illustrates the electronic device 600 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowchart may be implemented as a computer software program. For example, some embodiments of the present disclosure include a computer program product, which includes a computer program carried by a non-transitory computer-readable medium. The computer program includes program codes for performing the method shown in the flowchart. In such embodiments, the computer program may be downloaded online through the communication apparatus 609 and installed, or may be installed from the storage apparatus 608, or may be installed from the ROM 602. When the computer program is executed by the processing apparatus 601, the above-mentioned functions defined in the method of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program codes contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-described computer-readable medium may be included in the above-described electronic device, or may also exist alone without being assembled into the electronic device.

The above-described computer-readable medium carries one or more programs, and when the one or more programs are executed by the electronic device, the electronic device is caused to: obtain a team feature of a game team to be matched; obtain, by a pre-trained clustering model, a target class cluster to which the game team to be matched belongs according to the team feature, wherein the clustering model is obtained by training with a constraint goal of differing in game levels of sample game teams in different class clusters under different game room types and minimizing a quantitative difference of sample game teams in any two class clusters under different game room types; allocate the game team to be matched to a target matching pool of a plurality of matching pools according to the target class cluster of the game team to be matched and a game room type, wherein the matching pool is configured to accommodate game teams corresponding to one class cluster under different game room types, and a level difference between the game teams in the matching pool is minimum; and determine, in the target matching pool, a game team matched with the game team to be matched.

The computer program codes for performing the operations of the present disclosure may be written in one or more programming languages or a combination thereof. The above-described programming languages include but are not limited to object-oriented programming languages such as Java, Smalltalk, C++, and also include conventional procedural programming languages such as the "C" programming language or similar programming languages. The program codes may by executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flow chart and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, the example 1 provides a method for game matching, comprising:

obtaining a team feature of a game team to be matched;

obtaining, by a pre-trained clustering model, a target class cluster to which the game team to be matched belongs according to the team feature, wherein the clustering model is obtained by training with a constraint goal of differing in game levels of sample game teams in different class clusters under different game room types and minimizing a quantitative difference of sample game teams in any two class clusters under different game room types;

allocating the game team to be matched to a target matching pool of a plurality of matching pools according to the target class cluster of the game team to be matched and a game room type, wherein the matching pool is configured to accommodate game teams corresponding to one class cluster under different game room types, and a level difference between the game teams in the matching pool is minimum; and determining, in the target matching pool, a game team matched with the game team to be matched.

According to one or more embodiments of the present disclosure, the example 2 provides the method for the example 1, and obtaining the team feature of the game team to be matched comprises:

obtaining a user feature and/or a device feature corresponding to at least one user in the game team to be matched; and determining the team feature of the game team to be matched according to the user feature and/or the device feature in the game team to be matched.

According to one or more embodiments of the present disclosure, the example 3 provides the method for the example 2, and in a case that the team feature is determined by the user feature and the device feature, determining the team feature of the game team to be matched according to the user feature and/or the device feature in the game team to be matched comprises:

vectorizing the user feature and the device feature in the game team to be matched, respectively, and obtaining a user feature vector corresponding to the user feature and a device feature vector corresponding to the device feature; and concatenating the user feature vector and the device feature vector to obtain a team feature vector for characterizing the team feature.

According to one or more embodiments of the present disclosure, the example 4 provides the method for the example 1, and the clustering model comprises clustering sub-models corresponding to different game room types, and the clustering model is obtained by:

for a sample game team corresponding to each game room type, performing, with a goal constraint, iterative optimization on a parameter of an initial clustering sub-model corresponding to the game room type according to a sample team feature of the sample game team corresponding to the game room type, until an iteration stop condition is met, so as to obtain a clustering sub-model corresponding to the game room type; and determining the clustering model according to clustering sub-models corresponding to all game room types, wherein the goal constraint is: a minimum quantitative difference of sample game teams between different class clusters and a minimum difference in game level between sample game teams in a same class cluster.

According to one or more embodiments of the present disclosure, the example 5 provides the method for the example 4, and the parameter of the initial clustering sub-model comprises an initial allocation matrix and an initial indication matrix, and for the sample game team corresponding to each game room type, performing, with the goal constraint, the iterative optimization on the parameter of the initial clustering sub-model corresponding to the game room type according to the sample team feature of the sample game team corresponding to the game room type, until the iteration stop condition is met, so as to obtain the clustering sub-model corresponding to the game room type, comprises:

for the sample game team corresponding to each game room type, performing, with the goal constraint, the iterative optimization on the initial allocation matrix and the initial indication matrix according to the sample team feature of the sample game team corresponding to the game room type, until the iteration stop condition is met, so as to obtain the clustering sub-model corresponding to the game room type, wherein the iteration stop condition comprises: the matrix no longer changing during the iterative optimization, or a number of iterative optimization times being greater than a preset number of times.

According to one or more embodiments of the present disclosure, the example 6 provides the method for the example 5, and for the sample game team corresponding to each game room type, performing, with the goal constraint, the iterative optimization on the initial allocation matrix and the initial indication matrix according to the sample team feature of the sample game team corresponding to the game room type, until the iteration stop condition is met, so as to obtain the clustering sub-model corresponding to the game room type, comprises:

for the sample game team corresponding to each game room type, determining a target indication matrix that minimizes a value of the parameter according to the initial allocation matrix and the sample team feature of the sample game team corresponding to the game room type;

determining a target allocation matrix that minimizes the value of the parameter according to the target indication matrix and the sample team feature of the sample game team corresponding to the game room type, and in a case that the iteration stop condition preset is not met, determining the target allocation matrix as a new initial allocation matrix and returning to perform determining the target indication matrix that minimizes the value of the parameter according to the initial allocation matrix and the sample team feature of the sample game team corresponding to the game room type, until the iteration stop condition preset is met; and obtaining the clustering sub-model according to a corresponding target indication matrix and a corresponding target allocation matrix when the iteration stop condition preset is met.

According to one or more embodiments of the present disclosure, the example 7 provides the method for the example 6, and the method further comprises:

determining, by using a dynamic path planning algorithm, a mapping relationship between each class cluster in target indication matrices corresponding to different clustering sub-models and the matching pool according to target indication matrices corresponding to all clustering sub-models.

According to one or more embodiments of the present disclosure, the example 8 provides an apparatus for game matching, comprising:

an obtaining module, configured to obtain a team feature of a game team to be matched;

a first determination module, configured to obtain, by a pre-trained clustering model, a target class cluster to which the game team to be matched belongs according to the team feature, wherein the clustering model is obtained by training with a constraint goal of differing in game levels of sample game teams in different class clusters under different game room types and minimizing a quantitative difference of sample game teams in any two class clusters under different game room types;

an allocation module, configured to allocate the game team to be matched to a target matching pool of a plurality of matching pools according to the target class cluster of the game team to be matched and a game room type, wherein the matching pool is configured to accommodate game teams corresponding to one class cluster under different game room types, and a level difference between the game teams in the matching pool is minimum; and a matching module, configured to determine, in the target matching pool, a game team matched with the game team to be matched.

According to one or more embodiments of the present disclosure, the example 9 provides a computer-readable medium, on which a computer program is stored, and the computer program, when executed by a processor, causes the processor to perform steps of the method for game matching according to any one of examples 1-7.

According to one or more embodiments of the present disclosure, the example 10 provides an electronic device, comprising:

a storage apparatus, on which a computer program is stored; and a processing apparatus, configured to execute the computer program on the storage apparatus to perform steps of the method for game matching according to any one of examples 1-7.

The above description is merely a preferred embodiment of the present disclosure and an illustration of the technical principles employed. Those skilled in the art should understand that the scope of disclosure involved in the present disclosure is not limited to the technical solutions formed by the specific combination of the above-mentioned technical features, and should also cover, without departing from the above-mentioned disclosed concept, other technical solutions formed by any combination of the above-mentioned technical features or their equivalents, such as technical solutions which are formed by replacing the above-mentioned technical features with the technical features disclosed in the present disclosure (but not limited to) with similar functions.

Additionally, although operations are depicted in a particular order, it should not be understood that these operations are required to be performed in a specific order as illustrated or in a sequential order. Under certain circumstances, multitasking and parallel processing may be advantageous. Likewise, although the above discussion includes several specific implementation details, these should not be interpreted as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combinations.

Although the subject matter has been described in language specific to structural features and/or method logical actions, it should be understood that the subject matter defined in the appended claims is not necessarily limited to the specific features or actions described above. Rather, the specific features and actions described above are merely example forms of implementing the claims. Specific manners of operations performed by the modules for the apparatus in the above embodiments have been described in detail in the embodiments regarding the method, which will not be explained and described in detail herein again.

The invention claimed is:

1. A method for game matching, comprising:

obtaining a team feature of a game team to be matched;

obtaining, by a pre-trained clustering model, a target class cluster to which the game team to be matched belongs according to the team feature, wherein the clustering model is obtained by training with a constraint goal of differing in game levels of sample game teams in different class clusters under different game room types and minimizing a quantitative difference of sample game teams in any two class clusters under different game room types;

allocating the game team to be matched to a target matching pool of a plurality of matching pools according to the target class cluster of the game team to be matched and a game room type, wherein the matching pool is configured to accommodate game teams corresponding to one class cluster under different game room types, and a level difference between the game teams in the matching pool is minimum; and determining, in the target matching pool, a game team matched with the game team to be matched.

2. The method according to claim 1, wherein obtaining the team feature of the game team to be matched comprises:

obtaining a user feature and/or a device feature corresponding to at least one user in the game team to be matched; and determining the team feature of the game team to be matched according to the user feature and/or the device feature in the game team to be matched.

3. The method according to claim 2, wherein in a case that the team feature is determined by the user feature and the device feature, determining the team feature of the game team to be matched according to the user feature and/or the device feature in the game team to be matched comprises:

vectorizing the user feature and the device feature in the game team to be matched, respectively, and obtaining a user feature vector corresponding to the user feature and a device feature vector corresponding to the device feature; and concatenating the user feature vector and the device feature vector to obtain a team feature vector for characterizing the team feature.

4. The method according to claim 1, wherein the clustering model comprises clustering sub-models corresponding to different game room types, and the clustering model is obtained by:

for a sample game team corresponding to each game room type, performing, with a goal constraint, iterative optimization on a parameter of an initial clustering sub-model corresponding to the game room type according to a sample team feature of the sample game team corresponding to the game room type, until an iteration stop condition is met, so as to obtain a clustering sub-model corresponding to the game room type; and determining the clustering model according to clustering sub-models corresponding to all game room types, wherein the goal constraint is: a minimum quantitative difference of sample game teams between different class clusters and a minimum difference in game level between sample game teams in a same class cluster.

5. The method according to claim 4, wherein the parameter of the initial clustering sub-model comprises an initial allocation matrix and an initial indication matrix, and for the sample game team corresponding to each game room type, performing, with the goal constraint, the iterative optimization on the parameter of the initial clustering sub-model corresponding to the game room type according to the sample team feature of the sample game team corresponding to the game room type, until the iteration stop condition is met, so as to obtain the clustering sub-model corresponding to the game room type, comprises:

for the sample game team corresponding to each game room type, performing, with the goal constraint, the iterative optimization on the initial allocation matrix and the initial indication matrix according to the sample team feature of the sample game team corresponding to the game room type, until the iteration stop condition is met, so as to obtain the clustering sub-model corresponding to the game room type, wherein the iteration stop condition comprises: the matrix no longer changing during the iterative optimization, or a number of iterative optimization times being greater than a preset number of times.

6. The method according to claim 5, wherein for the sample game team corresponding to each game room type, performing, with the goal constraint, the iterative optimization on the initial allocation matrix and the initial indication matrix according to the sample team feature of the sample game team corresponding to the game room type, until the iteration stop condition is met, so as to obtain the clustering sub-model corresponding to the game room type, comprises:

for the sample game team corresponding to each game room type, determining a target indication matrix that minimizes a value of the parameter according to the initial allocation matrix and the sample team feature of the sample game team corresponding to the game room type;

determining a target allocation matrix that minimizes the value of the parameter according to the target indication matrix and the sample team feature of the sample game team corresponding to the game room type, and in a case that the iteration stop condition preset is not met, determining the target allocation matrix as a new initial allocation matrix and returning to perform determining the target indication matrix that minimizes the value of the parameter according to the initial allocation matrix and the sample team feature of the sample game team corresponding to the game room type, until the iteration stop condition preset is met; and obtaining the clustering sub-model according to a corresponding target indication matrix and a corresponding target allocation matrix when the iteration stop condition preset is met.

7. The method according to claim 6, further comprising:

determining, by using a dynamic path planning algorithm, a mapping relationship between each class cluster in target indication matrices corresponding to different clustering sub-models and the matching pool according to target indication matrices corresponding to all clustering sub-models.

8. An apparatus for game matching, comprising:

an obtaining module, configured to obtain a team feature of a game team to be matched;

a first determination module, configured to obtain, by a pre-trained clustering model, a target class cluster to which the game team to be matched belongs according to the team feature, wherein the clustering model is obtained by training with a constraint goal of differing in game levels of sample game teams in different class clusters under different game room types and minimizing a quantitative difference of sample game teams in any two class clusters under different game room types;

an allocation module, configured to allocate the game team to be matched to a target matching pool of a plurality of matching pools according to the target class cluster of the game team to be matched and a game room type, wherein the matching pool is configured to accommodate game teams corresponding to one class cluster under different game room types, and a level difference between the game teams in the matching pool is minimum; and a matching module, configured to determine, in the target matching pool, a game team matched with the game team to be matched.

9. The apparatus according to claim 8, wherein the obtaining module comprises:

a first obtaining sub-module, configured to obtain a user feature and/or a device feature corresponding to at least one user in the game team to be matched; and a first determination sub-module, configured to determine the team feature of the game team to be matched according to the user feature and/or the device feature in the game team to be matched.

10. The apparatus according to claim 9, wherein in a case that the team feature is determined by the user feature and the device feature, the first determination sub-module is configured to:

vectorize the user feature and the device feature in the game team to be matched, respectively, and obtain a user feature vector corresponding to the user feature and a device feature vector corresponding to the device feature; and concatenate the user feature vector and the device feature vector to obtain a team feature vector for characterizing the team feature.

11. The apparatus according to claim 8, wherein the clustering model comprises clustering sub-models corresponding to different game room types, and the apparatus further comprises:

an iteration module, configured to, for a sample game team corresponding to each game room type, perform, with a goal constraint, iterative optimization on a parameter of an initial clustering sub-model corresponding to the game room type according to a sample team feature of the sample game team corresponding to the game room type, until an iteration stop condition is met, so as to obtain a clustering sub-model corresponding to the game room type; and a second determination module, configured to determine the clustering model according to clustering sub-models corresponding to all game room types, wherein the goal constraint is: a minimum quantitative difference of sample game teams between different class clusters and a minimum difference in game level between sample game teams in a same class cluster.

12. The apparatus according to claim 11, wherein the parameter of the initial clustering sub-model comprises an initial allocation matrix and an initial indication matrix, and the iteration module comprises:

an iteration sub-module, configured to, for the sample game team corresponding to each game room type, perform, with the goal constraint, the iterative optimization on the initial allocation matrix and the initial indication matrix according to the sample team feature of the sample game team corresponding to the game room type, until the iteration stop condition is met, so as to obtain the clustering sub-model corresponding to the game room type, wherein the iteration stop condition comprises: the matrix no longer changing during the iterative optimization, or a number of iterative optimization times being greater than a preset number of times.

13. The apparatus according to claim 12, wherein the iteration sub-module is configured to:

for the sample game team corresponding to each game room type, determine a target indication matrix that minimizes a value of the parameter according to the initial allocation matrix and the sample team feature of the sample game team corresponding to the game room type;

determine a target allocation matrix that minimizes the value of the parameter according to the target indication matrix and the sample team feature of the sample game team corresponding to the game room type, and in a case that the iteration stop condition preset is not met, determine the target allocation matrix as a new initial allocation matrix and return to perform determining the target indication matrix that minimizes the value of the parameter according to the initial allocation matrix and the sample team feature of the sample game team corresponding to the game room type, until the iteration stop condition preset is met; and obtain the clustering sub-model according to a corresponding target indication matrix and a corresponding target allocation matrix when the iteration stop condition preset is met.

14. The apparatus according to claim 13, further comprising:

a third determination module, configured to determine, by using a dynamic path planning algorithm, a mapping relationship between each class cluster in target indication matrices corresponding to different clustering sub-models and the matching pool according to target indication matrices corresponding to all clustering sub-models.

15. A computer-readable medium, on which a computer program is stored, wherein the computer program, when executed by a processor, causes the processor to:

obtain a team feature of a game team to be matched;

obtain, by a pre-trained clustering model, a target class cluster to which the game team to be matched belongs according to the team feature, wherein the clustering model is obtained by training with a constraint goal of differing in game levels of sample game teams in different class clusters under different game room types and minimizing a quantitative difference of sample game teams in any two class clusters under different game room types;

allocate the game team to be matched to a target matching pool of a plurality of matching pools according to the target class cluster of the game team to be matched and a game room type, wherein the matching pool is configured to accommodate game teams corresponding to one class cluster under different game room types, and a level difference between the game teams in the matching pool is minimum; and determine, in the target matching pool, a game team matched with the game team to be matched.

16. The computer-readable medium according to claim 15, wherein obtaining the team feature of the game team to be matched comprises:

obtaining a user feature and/or a device feature corresponding to at least one user in the game team to be matched; and determining the team feature of the game team to be matched according to the user feature and/or the device feature in the game team to be matched.

17. The computer-readable medium according to claim 16, wherein in a case that the team feature is determined by the user feature and the device feature, determining the team feature of the game team to be matched according to the user feature and/or the device feature in the game team to be matched comprises:

vectorizing the user feature and the device feature in the game team to be matched, respectively, and obtaining a user feature vector corresponding to the user feature and a device feature vector corresponding to the device feature; and concatenating the user feature vector and the device feature vector to obtain a team feature vector for characterizing the team feature.

18. The computer-readable medium according to claim 15, wherein the clustering model comprises clustering sub-models corresponding to different game room types, and the clustering model is obtained by:

for a sample game team corresponding to each game room type, performing, with a goal constraint, iterative optimization on a parameter of an initial clustering sub-model corresponding to the game room type according to a sample team feature of the sample game team corresponding to the game room type, until an iteration stop condition is met, so as to obtain a clustering sub-model corresponding to the game room type; and determining the clustering model according to clustering sub-models corresponding to all game room types, wherein the goal constraint is: a minimum quantitative difference of sample game teams between different class clusters and a minimum difference in game level between sample game teams in a same class cluster.

19. The computer-readable medium according to claim 18, wherein the parameter of the initial clustering sub-model comprises an initial allocation matrix and an initial indication matrix, and for the sample game team corresponding to each game room type, performing, with the goal constraint, the iterative optimization on the parameter of the initial clustering sub-model corresponding to the game room type according to the sample team feature of the sample game team corresponding to the game room type, until the iteration stop condition is met, so as to obtain the clustering sub-model corresponding to the game room type, comprises:

for the sample game team corresponding to each game room type, performing, with the goal constraint, the iterative optimization on the initial allocation matrix and the initial indication matrix according to the sample team feature of the sample game team corresponding to the game room type, until the iteration stop condition is met, so as to obtain the clustering sub-model corresponding to the game room type, wherein the iteration stop condition comprises: the matrix no longer changing during the iterative optimization, or a number of iterative optimization times being greater than a preset number of times.

20. An electronic device, comprising:

a storage apparatus, on which a computer program is stored; and a processing apparatus, configured to execute the computer program on the storage apparatus to perform steps of the method according to claim 1.

* * * * *